United States Patent [19]

Taniai et al.

[11] 4,135,277

[45] Jan. 23, 1979

[54] MOLDING CLIP

[75] Inventors: Tadayoshi Taniai, Koganei; Takuo Yuda, Yokohama, both of Japan

[73] Assignee: Nifco, Inc., Tokyo, Japan

[21] Appl. No.: 921,284

[22] Filed: Jul. 3, 1978

Related U.S. Application Data

[63] Continuation of Ser. No. 799,863, May 23, 1977, abandoned.

[30] Foreign Application Priority Data

May 25, 1976 [JP] Japan .............................. 51-66048[U]
Aug. 3, 1976 [JP] Japan ............................ 51-103254[U]

[51] Int. Cl.² .............................................. E06B 3/58
[52] U.S. Cl. ................................... 24/73 PC; 52/400; 296/84 R; 296/93
[58] Field of Search ............. 24/73 R, 73 FT, 73 PC; 52/400, 502, 741; 296/84 R, 84 A, 93

[56] References Cited

U.S. PATENT DOCUMENTS

| | | | |
|---|---|---|---|
| 3,081,504 | 3/1963 | Bohnsack | 24/73 PC |
| 3,155,422 | 11/1964 | Campbell et al. | 296/93 |
| 3,274,740 | 9/1966 | Hall | 296/84 R |
| 3,774,363 | 11/1973 | Kent | 52/400 |
| 3,851,432 | 12/1974 | Griffin | 52/400 |

*Primary Examiner*—Louis Rimrodt
*Attorney, Agent, or Firm*—Jack R. Halvorsen; Robert W. Beart

[57] ABSTRACT

Disclosed herein is a one-piece plastic molding clip which comprises a base plate, a resilient engaging arm extending from the one edge of and generally parallel to said plate and provided at the free end thereof with a molding-engaging snap catch and resilient receiving members protruding from the base plate to the front side thereof and resiliently engaging the edge of a plate glass. This molding clip fastens a plate glass and a molding to the frame of an automobile window, front or rear, by causing said base plate having an adhesive tape or similar fastening agent applied to the rear face thereof to be fastened to the window frame, supporting the edge of the plate glass on the resilient receiving members, inserting the molding adjacent the window frame and the rear face of the base plate and bringing the molding into fast engagement with the snap catch.

12 Claims, 18 Drawing Figures

MOLDING CLIP

This is a continuation, of application Ser. No. 799,863, filed May 23, 1977, now abandoned.

BACKGROUND OF THE INVENTION

This invention relates to a clip for immobilizing a decorative molding to be attached along the edge of the plate of glass in the front or rear window of an automobile.

In setting a plate of glass in the front or rear window of an automobile, it is a widely known practice to fasten a molding along the edge of the window for the purpose of filling up the gap occurring between the edge of the window frame and that of the plate of glass or imparting a decorative effect to the bondary.

The fastening of the molding has heretofore been accomplished in many instances by a method which comprises welding T-shaped studs at suitable intervals along the edge of the window, fastening the plate of glass to the edge by use of an adhesive agent, attaching a clip made of synthetic resin to each of said studs and bringing the molding into fast engagement with the clips and the glass. Another method heretofore used for this purpose comprises causing clips made of resilient metal plate material to be attached in advance to the edge of the plate of glass, setting the plate of glass in position in the window opening so as to cause the plate of glass to be immovably joined to the edge of the window in conjunction with said clips by the medium of an adhesive agent applied in advance to said edge of the window and thereafter bringing a molding into fast engagement with the clips.

The first method mentioned above necessitates preliminary individual welding of the T-shaped studs and furthermore involves the subsequent extra work of attaching the clips to the welded studs and, hence, the operation as a whole proves to be inefficient and costly. The second method mentioned above immobilizes the clips, not by relying upon studs preparatorily imbedded into the window frame, but by utilizing an adhesive agent primarily intended for fastening the plate of glass to the window frame. Use of this method, therefore, requires advanced training in the work of applying the adhesive agent and the work of setting the plate of glass having clips attached thereto in position in the window frame and is hardly appropriate for adoption in an assembly line. Because of the use of clips made of a metal, this method has an additional disadvantage that the clips tend to rust, and at the time of assembly are likely to cause scratches in the paint finish of the automobile, which leads to further corrosion problems.

An object of the present invention is to provide a molding clip which is outstandingly adaptable to use in mass production assembly in that it is not likely to mar the paint finish of the window frame, in that it is totally safe from rusting, and further permits easy selection of the position for its attachment since it can be attached simultaneously with the plate of glass to the window frame, if desired.

Another object of the present invention is to provide a molding clip which insures easy attachment of the molding, precludes the possibility of the clip being pushed out of position by the attachment of the molding and permits later release of the molding from engagement with the clip if such should become necessary.

Still another object of this invention is to provide a molding clip which can be integrally molded easily and inexpensively by the technique of injection molding of a plastic material and which can easily be adapted to the existing process of molding attachment.

SUMMARY OF THE INVENTION

To accomplish the objects described above, according to the present invention, there is provided a molding clip which comprises in combination a base plate adapted to be secured to the edge of a window in an automobile, a resilient engaging arm extending from the one edge of and generally parallel to said base plate and provided at the free end thereof with a molding-engaging snap catch and resilient receiving members protruding from the base plate to the front side thereof and resiliently receiving the edge of plate glass.

With this molding clip, required attachment of a decorative and plate glass-immobilizing molding possessed of a flange portion is accomplished by joining the rear surface of said base plate through the medium of a two-face adhesive tape or other suitable means to the edge of the window frame, allowing the edge of the plate of glass to be set in the window frame to be supported by said resilient receiving members, setting the plate of glass in position in the window frame and thereafter bringing the molding into hooked engagement with the molding-engaging arm. This molding clip enables the plate of glass to be easily and safely attached substantially immovably to the window frame by causing the plate of glass to be supported on one side of the edge thereof by the clip fastened to the window frame and on the other side of the edge thereof by the molding fastened to the molding-engaging snap catch. Since the clip is fastened to the window frame by means of an adhesive tape, or other adhesive means, the positioning of the clip can easily be attained without inflicting injuries to the paint finish of the window frame. Release of the clip from engagement with the molding can be carried out easily if it should become necessary to replace the plate of glass.

Because of the simplicity of its structure, the molding clip of the present invention can easily be integrally molded by the conventional technique of injection molding of a plastic material and can readily be adapted to the existing process for the engagement of the plate of glass and the molding.

The other objects and characteristic features of this invention will become apparent from the detailed description to be given hereinbelow with reference to the accompanying drawings.

DETAILED DESCRIPTION OF THE INVENTION

Figure 1:
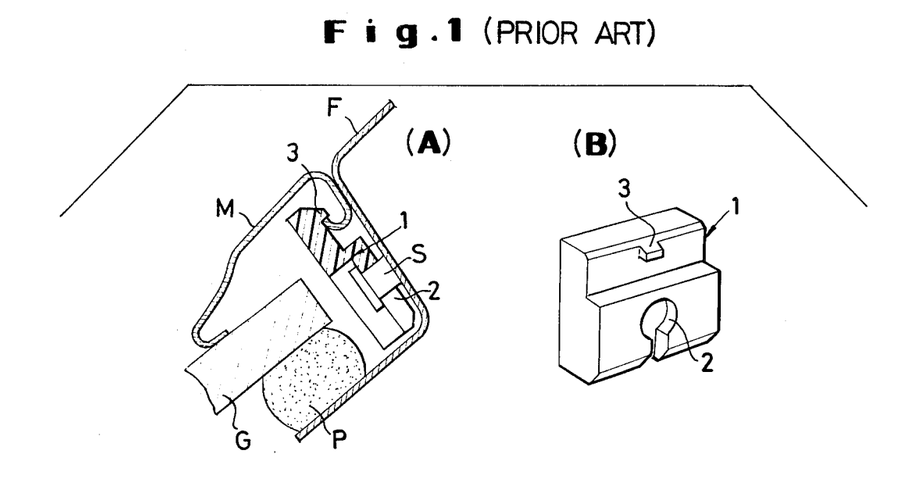
FIGS. 1A and 1B are, respectively, a vertical sectional view of a prior art application of a plastic clip of the type shown in perspective.

FIG. 1 illustrates a typical example of a prior art molding clip representing a partially enlarged sectional view of a window frame F used in an automobile for attachment of a windshield or a rear window.

A plate of glass G for the window is immobilized by being supported on one side by a molding M held in position by a molding clip 1 and on the other side by the edge portion of the window frame F through the medium of a packing material P such as an adhesive agent.

With the prior art molding clips 1 of such a construction, studs S must be fixed by welding or some other means at prescribed positions along the window frame to permit fastening of the clips to the window frame F.

The molding clips 1 are each provided at the lower central portion with a key slot fitting hole 2 for receiving the head of a stud S and at the upper portion with a molding engaging snap catch 3 for permitting hooked engagement of the hooked flange portion of the molding.

With these conventional molding clips, required setting of the plate of glass is accomplished by fastening said molding clips to the window frame F while allowing the head portions of studs S to be inserted into the fitting holes 2, applying a packing material P such as an adhesive agent to the recessed portion of the window frame F, thereafter inserting the plate of glass in position into the window frame and, after the plate of glass has been set in position as described above, forcing a springy metallic molding M between the window frame F and the molding clip with the hooked flange portion at the leading end and bringing the hooked flange portion into hooked engagement with the generally rigid molding-engaging snap catch so as to obstruct release of the molding.

Since the conventional molding clips necessitate preliminary mounting of studs, as described above, the fabrication of the window frame inevitably entails the extra work of complicated welding and the insertion of the molding may scratch paint finish of the window frame. Removal of the plate of glass fastened in position or the molding held in hooked engagement may be accomplished by breaking the molding or molding clips or by strongly pushing up the plate of glass from below (in the position of the drawing) with force enough to upset the inserted engagement between the studs S and the fitting holes 2 of the molding clips. In either case, the removal is not obtained readily.

The prior art molding clips of the construction of FIG. 1 have a serious disadvantage in terms of both ease of handling and cost.

Figure 2:
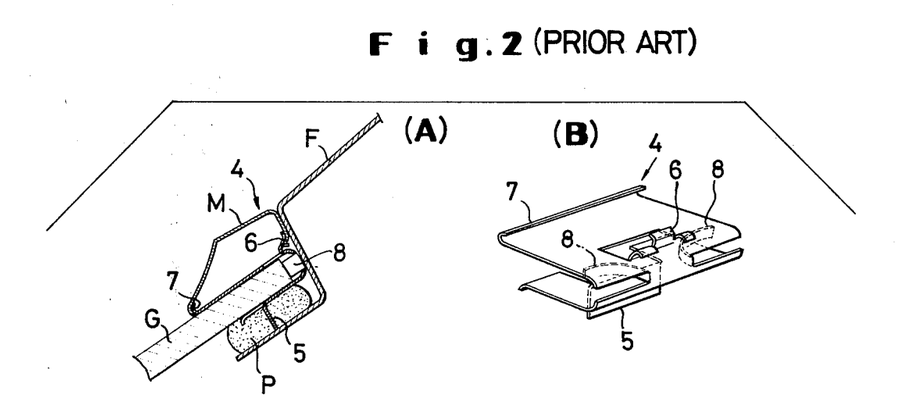
FIGS. 2A and 2B are, respectively, a vertical sectional view of a prior art application of a metal clip of the type shown in perspective.

Other prior art molding clips of another structure, as illustrated in FIG. 2, are each formed by fabricating one metal sheet in the shape of the letter U, as shown in FIG. 2B. As many molding clips 4 as are necessary are clamped astraddle the edge portion of the plate of glass G in advance. To the peripheral edge of the window frame F a packing material P of adhesive agent or the like is applied in advance. As the plate of glass is fastened to the window frame F, the tongues 5 of the molding clips are allowed to be embedded into the packing material P. When the plate of glass is set in position onto the window frame F by means of the adhesive packing material P, it is ready for attachment of a molding M to the periphery thereof. This attachment of the molding is accomplished by bringing one of the bent flange portions formed at the opposite edges of the molding into hooked engagement with the engaging member 6 formed by cutting and raising a portion of the molding clip in the shape of an S and bringing the other bent flange portion of molding M into hooked engagement with the engaging member 7 formed by bending the end portion of the molding clip. As the plate of glass G is held fast in position by the molding clips, it is resiliently held at its end portion by glass engaging arms 8.

With the prior art molding clips of the construction shown in FIG. 2, the setting of the plate of glass and the molding is effected by a method which comprises preassembling the clips 4 to the edge of the plate of glass and fastening the plate of glass G in conjunction with the molding clips 4 onto the edge of the window frame F by use of an adhesive agent P applied in advance to said edge. An expected, this application of the adhesive agent requires an advanced technical skill on the part of the worker. In fact, the required degree of skill is so great that the method as a whole is hardly useable in an assembly line, thus depriving the method of its technical feasibility.

The molding clips 4 are produced by fabricating resilient metal sheet to shape. They, therefore, have a disadvantage that the clips eventually rust and this rust transfers to the automobile body and the plate glass surface. The clips are also likely to scratch the paint finish of the automobile body if they should accidentally collide with the painted surface during the work of the window assembly. Such scratches can eventually cause corrosion of the substratal metal through the marred surface. Besides, possible variation in the size of the plates of glass and variation in window size cause a variation in the retaining strength of clips, and on account of close association with the rigidity of the molding in use a gap is likely to occur between the automobile body and the molding, with the undesirable result that the molding suffers from impaired appearance and degraded quality.

In view of the various disadvantages suffered by the typical molding clips hereto available as described above, the present invention aims to provide molding clips free from these disadvantages. Now, the present invention will be described with reference to the preferred embodiments illustrated in FIG. 3 and the subsequent figures.

Figure 3:
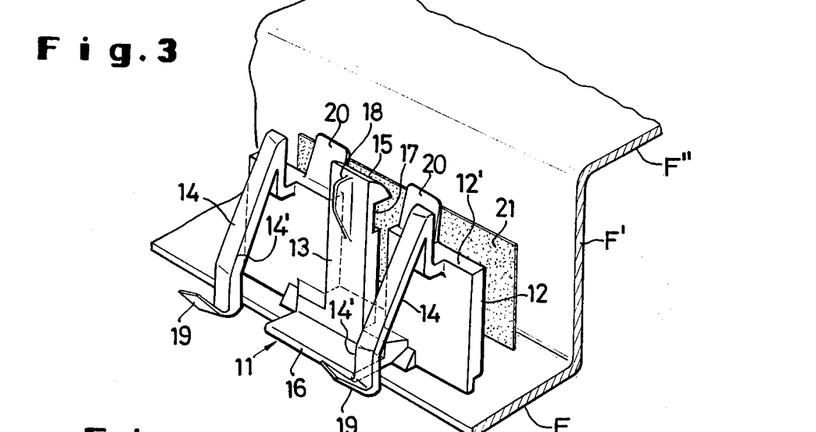
FIG. 3 is a perspective view of one preferred embodiment of the molding clip according to this invention.
Figures 4, 5:
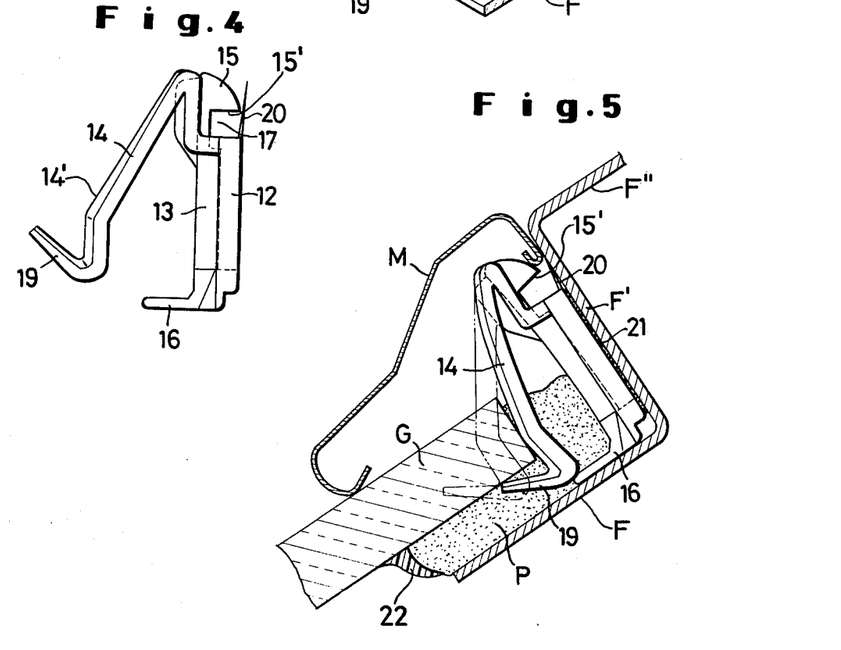
FIG. 4 is an end view of the molding clip of FIG. 3.
FIG. 5 is an end view in partial section of the molding clip of FIG. 3, illustrating the manner in which a molding is fastened with the clip.

A clip 11 includes as its main component parts a base plate 12 adapted to be laid in face-to-face contact on the connecting wall F' rising from the window frame F into the body F'', a resilient engaging arm 13 vertically rising in offset relation from the lower edge of and generally parallel to said base plate, as seen in the drawing, and provided at the free end thereof with a backwardly projecting snap catch 15 for hooked engagement with the molding M. Resilient receiving members 14 protrude from the upper edge of the base plate in spaced relation to the front side of the base plate (FIGS. 3 and 4). The base plate 12 functions as a base seat immobilized to the edge wall F' of a window frame and is provided with a flange element 16 protruding from the lower edge thereof perpendicularly to the front side. The clip is brought into stable engagement for snug rest at the corner portion of the edge of the window by causing the rear side of the base plate 12 and the lower side of the flange element 16 to come into perfect contact with the two inner sides of the corner formed at the juncture of F and F'.

The engaging arm 13 serves to retain the molding in hooked engagement by bringing the hooked flange edge of the molding M into engagement with the molding-engaging snap catch 15 formed at the free end thereof. In the illustrated embodiment, this engaging arm 13 is formed in a rising state as if cut off and raised from the central portion of the base plate 12. The main body of the engaging arm 13 is located in spaced relation to the front face of the base plate and the molding-engaging snap catch 15 formed at the free end of said engaging arm is formed in such a fashion that the leading end thereof protrudes beyond the upper edge 12' of the base plate 12 and with the shoulder 15' of snap catch 15 extends substantially to the rear face of the base plate. The rear side of the engaging arm 13 immediately below the molding-engaging snap catch 15 is notched to form shoulder 15' and an indentation 17, while the opposite side of the engaging arm 13 from said indentation is extended to give rise to an ear piece 18 adapted to permit hooked engagement of a tool which is used for releasing the molding from its engagement with the snap catch. The resilient receiving members 14 serve the dual purpose of contacting the edge of plate of glass G being set in the window frame and, by virtue of the pressure generated by said reception of the plate glass, pressing said base plate against the edge wall F' of the window frame F. In the preferred embodiment under discussion, the members 14 are extended from the upper edge of the base plate in a down-folded state and the extended portions are downwardly inclined toward the front so as to thrust out of the front side of the base plate, with their leading ends sharply bent up to form receiving portions 19. In the preferred embodiment illustrated here, the resilient receiving members are disposed one on each side of said engaging arm 13 in a symmetrical relationship relative to said engaging arm 13. Owing to the overall arm length including the folded portion 19, these receiving members manifest resilience, so that the edge of the plate glass may be snugly received by the receiving portions 19 formed at the forward ends thereof. The front sides of said resilient receiving members are twisted sideways so that the inner edges 14' of the front sides protrude in the form of ridges. When the plate of glass G is set in position as described afterward, these protruding edge ridges 14' serve the purpose of preventing the edge of the plate of glass from scraping off the adhesive packing material P applied to the lower face of the plate of glass.

Thin-walled tongue pieces 20 are formed on the rear side of the base plate and extend beyond the upper edge of the base plate on either side of the free end of the engaging arm 13. When the molding M is brought into engagement with the snap catch 15, the tongue pieces 20 will underlie the outer side of the hooked flange edge of the molding M, thus serving to prevent the molding from coming into direct contact with the edge wall F' of the window frame.

In a clip of the construction described above, a two-face adhesive tape 21 is attached (or a suitable adhesive agent may be applied) to the rear side of the base plate 12 with the clip being pressed and fastened immovably against the rising wall F' of the window frame through the medium of said tape. In this case, the base plate 12 is pressed against the rising wall F' only after the clip has been positionally stabilized by causing the flange piece 16 formed at the lower edge of the base plate 12 to fall snugly into perfect rest at the corner of the window frame. After a plurality of clips have been adhesively fastened at suitable intervals to the edge of window frame as described above, the plate of glass G having an adhesive packing material P applied in a required thickness to the lower face of its edge is poised over the array of clips and the edge of the plate of glass is slid on the front sides of the resilient receiving members 14 and driven backwardly until it comes into tight contact with the receiving portions 19 at the leading ends thereof while causing the pressure exerted by the edge of the plate of glass in motion to spread out the excessively applied adhesive packing material P against the frame F. If an excessive amount of the adhesive packing material P is utilized it can bury the lower portion of the base plate 12 and the forward ends of the resilient receiving members 14 and, after it is left to set, solidifies to immobilize them collectively. In this case, the possibility of the adhesive packing material P applied to the edge of the plate of glass being spread out under said pressure toward the interior portion of the plate of glass may effectively be precluded by providing the lower surface of the plate of glass with a dam or rubber seal 22 in advance of applying material P.

Figure 6:
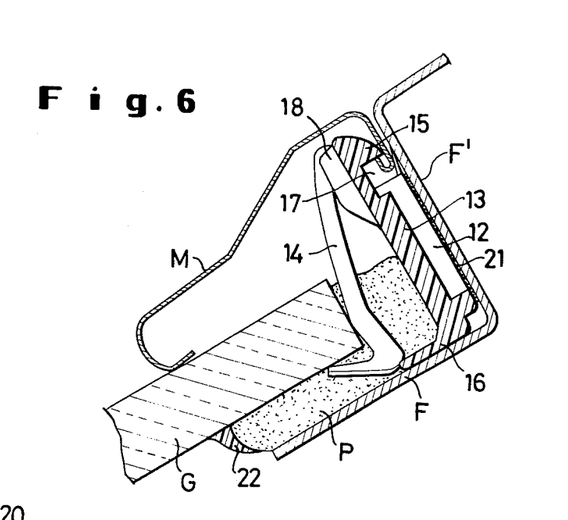
FIG. 6 is an end view in partial section of the molding clip of FIG. 3, illustrating the state in which the clip is put to use.

After the clips have been fastened to the window frame F and the adhesion has been accomplished through packing material P being applied to the edge of the glass plate, the molding M is brought down to cover the gap between the glass, the side wall F' and the clips. The hooked flanged edge at one side of the molding is wedged in between the tongue pieces 20 and the leading ends of engaging arm 13 (FIG. 5), with the result that the wedging makes the molding-engaging end pieces 15 bend forward and causes the hooked portion of the molding flange to be brought into hooked engagement with the molding-engaging snap catch 15'. The attachment of the molding is thus brought to completion (FIG. 6). In this case, the molding M is pressed down in the direction of expanding the hooked edges at the opposite ends thereof so as to generate a repulsive force in the molding itself. After the molding is fastened to said molding-engaging snap catch 15, said repulsive force presses the remaining free folded rounded edge against the front surface of the plate of glass and prevents any gap from occurring between the plate of glass and the molding.

Since the molding is fastened in position as described above, the clips tend to be lifted forward or upward by the repulsive force of the molding and consequently pull in the pealing direction the base plate 12 which has already been immovably fastened to the edge of the window frame through the medium of said adhesive tape. Nevertheless, the attachment of the molding does not cause the clips to be pushed up and the prying force exerted by the molding upon the engaging piece does not peel the adhesive tape because the engaging piece erving to keep the molding directly in hooked engagement is connected to the lower edge of the base plate and consequently transmits the resilient force of the molding indirectly to the base plate as previously described. This is due to the fact that said resilient receiving members 14 support the edge of the plate of glass and, under the load of the plate of glass, press said base plate against the rising wall F' of the edge of the window frame F and further because the receiving portions 19 formed at the forward ends thereof are held in firm contact with the lower side of the plate of glass to offset the upward pull.

With the molding clips produced according to the present invention, therefore, even when the molding is attached before the adhesive packing material P has thoroughly solidified, the clips will not come off their attached positions on the window frame wall F' but will maintain the molding in hooked engagement therewith. Thus, the attachment of the molding can be started before the adhesive packing material has been completely solidified. This means that the work of molding attachment can be carried out very quickly. The molding thus attached in position to the window frame will not suffer from such undesirable phenomena as partial peeling but will insure safe fastening of the plate of glass.

The receiving portions 19 of the resilient receiving members are held in fast contact with the lower side of the plate of glass and prevent the clips from lifting up. In the present preferred embodiment, they intervene between the glass and the window frame F and give rise to a fixed gap for retaining the adhesive packing material therebetween. Because of this fixed gap, a required amount of adhesive packing material remains intact in the gap in spite of the pressure which is produced when the plate of glass is mechanically inserted in position. The adhesive packing material thus retained in the gap serves to effect adhesive attachment of the plate glass and seals airtightly the gap between the plate glass and the edge of the window frame F.

Figure 7A:
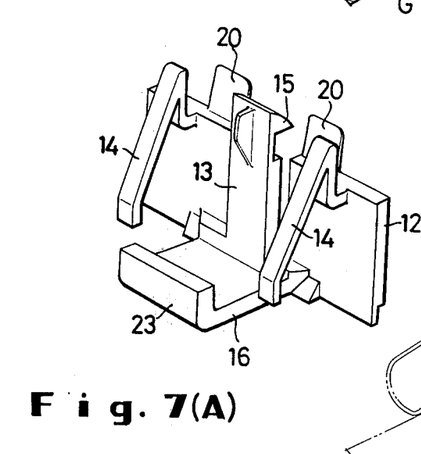
FIG. 7A and FIG. 7B are a perspective view and an end view with the frame, glass and molding shown in phantom, respectively, of another preferred embodiment of the molding clip according to the present invention.
Figure 7B:
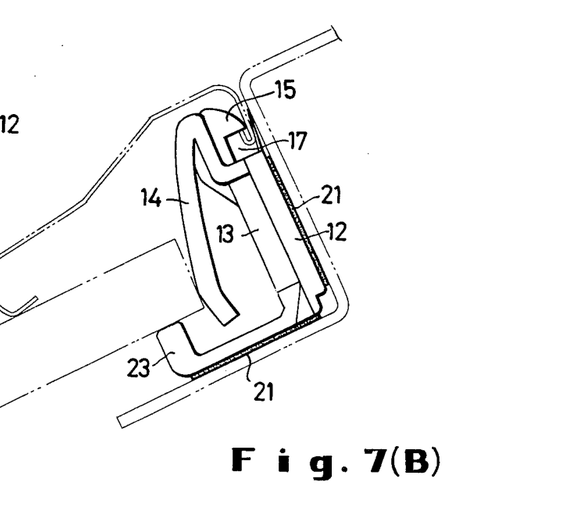

FIG. 7A and FIG. 7B represent another preferred embodiment involving a partial modification with respect to the resilient receiving members 14 and the base flange 16 of the preferred embodiment described above. This modification resides in omitting the formation of the receiving portions at the forward ends of said resilient receiving members and instead enlarging the base piece 16 for thereby forming on the upper side thereof an upstanding flange or pillow spacer 23 for supporting the lower side of the plate of glass.

In this preferred embodiment, the base flange 16 serves to stabilize the attachment of the base plate 12 as described previously and the pillow spacer 23 formed on the upper side thereof supports the lower side of the plate of glass and prevents the plate of glass from sinking further down and insures undisturbed retention of the adhesive packing material, not shown. At the same time the base flange 16 becomes buried itself under the pool of adhesive packing material and consequently immobilizes the clip as a whole. When the molding is attached to the clip, the base flange 16 which is held in tight contact with the lower side of the plate of glass prevents the clip from lifting up and also serves the purpose of preventing the adhesive tape from peeling off. The preceding preferred embodiment requires the adhesive tape to be applied to the rear side of the base plate. Owing to the enlargement of the area of the base flange 16, the present embodiment can further immobilize the clip by means of a double-faced adhesive tape 21 or other suitable adhesive means applied to the lower side of the base flange 16.

Figure 8:
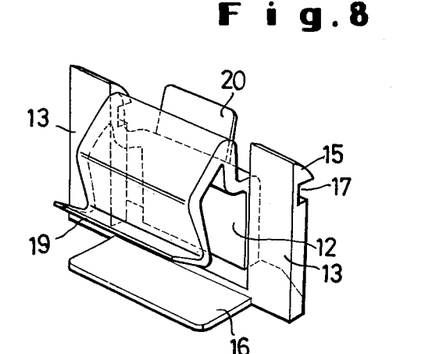
FIGS. 8 through 10, inclusive, are perspective views of other preferred embodiments of the molding clip according to this invention.
Figure 9:
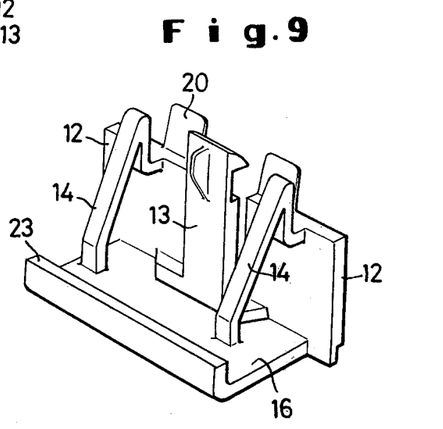
Figure 10:
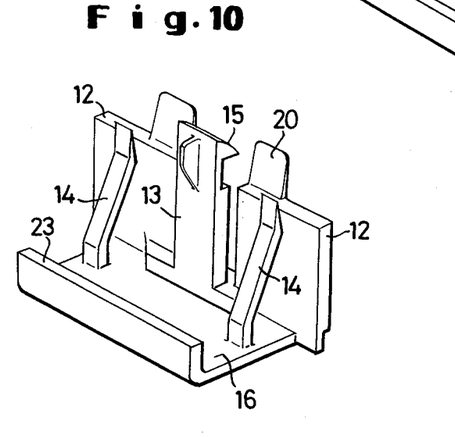

FIGS. 8 through 10, inclusive, represent modifications to the embodiments described above. The embodiment of FIG. 8 has engaging arms 13 disposed on either side of the base plate 12, while the embodiment shown in FIG. 9 has resilient receiving members 14 extending between the upper edge of the base plate 12 and the base flange 16 with their respective opposite ends integrally connected to the upper edge of the base plate 12 and the base flange 16. FIG. 10 shows resilient receiving members 14 of the embodiment of FIG. 9 cut off at the upper ends thereof from the upper edge of the base plate and supported exclusively by the base flange 16. All these embodiments produce substantially identical effects to those obtainable by the preferred embodiments illustrated in FIGS. 3 through 6, FIG. 7A and FIG. 7B.

To enhance the safety of the attachment of the molding and the plate of glass, the present invention also contemplates a molding clip of a construction that will now be described.

By way of example, there will first be considered the case in which the molding clip of this invention illustrated in FIG. 3 breaks loose from engagement owing to inferior workmanship during the attachment of the molding and the plate of glass. This problem will be discussed with reference to FIG. 11.

Figure 11:
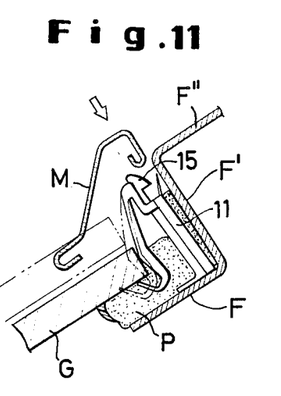
FIG. 11 is an explanatory diagram relating to the possible accidental release of the engagement of the molding clip according to this invention.

In the initial stage of the insertion of the plate of glass, when the edge of plate glass comes into sliding contact with the resilient receiving members 19 and forces the resilient receiving members to bend in the direction of the front surface of the base plate 12, the resilient receiving members are subject to the downward force exerted by the edge of the plate of glass. Since this downward force functions as a counter-clockwise moment in the entire clip, the upper portion of the base plate tends to depart from the window frame F, the lower portion thereof tends to press the adhesive tape toward the interior and the clip 11 tends to incline downwardly in the front direction and break loose from the window frame wall F'. Since the work of wedging the molding in between the engaging piece 15 and the tongue piece is carried out before the adhesive packing material P applied to the edge of the plate of glass has been thoroughly solidified and since the hooked edge of the molding M repulses the engaging catch 15 toward the front side, a force is additionally exerted to remove the clip from the aforementioned state. Consequently, the adhesive tape may be peeled off the clip's base plate or the window frame and the clip may possibly break loose. This trend is particularly conspicuous when the substrate of the adhesive tape is made of a material deficient in resilience. This is because the inclination of the base plate increases and the distance between the upper edge of the base plate and the edge of the window frame consequently increases in proportion as the amount of deformation of the adhesive tape increases. For this reason, the preferred embodiments of the present invention to be described hereinbelow each have provided at the lower portion of the rear side of base plate with a protrusion 24 having a height equal to or slightly smaller than the thickness of the tape 21 being used. When the aforementioned force develops and tends to exert its impact, said protrusion stops itself against the edge of the window frame, bears the force and prevents the clip from inclining downwardly toward the front side and breaking loose from the engagement.

Figure 12:
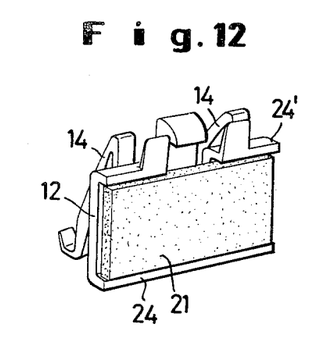
FIGS. 12 through 15, inclusive, are explanatory diagrams illustrating still other preferred embodiments of the molding clip of the present invention.

FIG. 12 illustrates a preferred embodiment in which protrusions 24, 24' having a height slightly smaller than the thickness of the adhesive tape 21 are formed along the lower edge and upper edge of the rear side of the base plate 12 and the adhesive tape 21 is applied to the rear side of the base plate between the two protrusions 24, 24'. In this case, in the initial stage of the insertion of plate glass, namely while the resilient receiving members 14 have not yet been bent by the edge of the plate of glass in the direction of the base plate 12, the force exerted by the edge of the plate of glass is received by the upper edge of the base plate at which the resilient receiving members are attached to the base plate. As a result, the upper edge of the base plate is moved in the direction of the window frame wall F'. The protrusion 24' formed along the upper edge serves to prevent such movement of the upper edge of the base plate. The protrusions are not always required to be formed continuously as illustrated but may instead be formed in segments, for example, in two segments falling one on each end or in three segments of which two fall one on each end and the remaining one falls at the center. Presence of the protrusion 24 prevents the adhesive tape from exposure.

Figure 14:
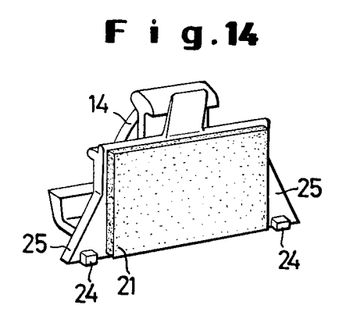
Figure 15:
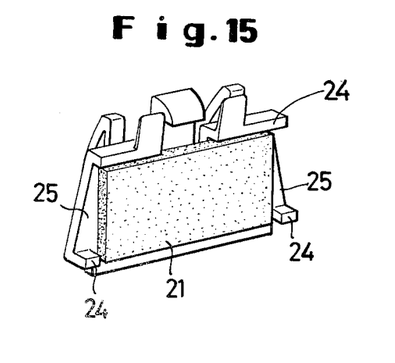

If these protrusions are formed on the rear side of the base plate in the portions which have heretofore been used for application of the adhesive tape 21, then the area available for application of the adhesive tape is decreased by the area occupied by the protrusions and the strength of attachment to the window frame is proportionally decreased. Such undesirable decrease may be eliminated by increasing the area of the base plate enough to provide the same area for application of the adhesive tape. If the size of the window opening in the direction of depth, namely the size of the base plate in the vertical direction, is limited, then the problem may be solved by forming extended portions 25 one each at the opposite ends of the base plate as illustrated in FIG. 14 or FIG. 15 and further forming protrusions 24 each at the lower ends of the rear sides of said extended portions 25.

Figure 13:
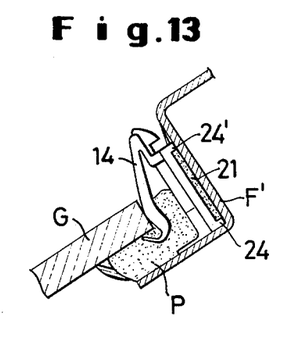

According to the molding clips of the present invention, in the initial stage of the insertion of the plate of glass, when the edge of the plate of glass pushes and bends the resilient receiving members 14 in the direction of the front side of the base plate, the moment exerted on the base plate of the clip tends to cause the lower portion of the base plate to press the adhesive tape and make the base plate incline downwardly toward the front side. However, the protrusions 24 bear this force and keep the adhesive tape from being compressed so that the base plate hardly inclines (FIG. 13). Thus, the possibility of the base plate breaking loose from the attachment with the edge of the window frame is completely eliminated. Similarly, the force which tends to pry the base plate out of the window frame during the insertion of the edge of molding into the engaging arm is supported by the protrusions 24'. Thus, the possibility of the clip breaking loose from the engagement by virtue of this force is substantially prevented.

In the illustrated preferred embodiments of this invention which have been described, the clips are temporarily fastened individually to the edge of the window frame by means of an adhesive tape 21 or other suitable adhesive agent and thereafter are collectively immobilized by utilizing the adhesive agent P being used for adhesive engagement of the plate of glass. The attachment of the plate of glass and the molding by use of the clips of this invention, therefore, can be effected quite efficiently as compared with the prior art method which involves preliminary welding attachment of studs for mounting clips, for example, and further eliminates the possibility of rusting. Additionally, the engaging arm intended to permit hooked engagement of the molding is extended from the lower edge of the base plate as described above and the engaging arm itself is vested with ample resilience and is permitted to function substantially independently. Consequently, if the molding is brought into hooked engagement before the adhesive agent has been thoroughly solidified, the resilient force of the molding will neither cause the adhesive tape to come off or move out of position nor make the molding break off from the fast engagement. Thus, the clips of this invention have an advantage that the work of attachment can be performed quickly.

Further, since the aforementioned engaging piece is formed so as to enjoy freedom of deformation, desired replacement of the of the molding alone can be obtained by forcibly lifting the edge of the molding held in pressed contact with the front side of the plate of glass by a suitable tool, inserting through the opening a plier or some other tool having a hook at its leading end, engaging the plier on the ear portion 18 or recess formed in the engaging arm, pulling the plier to bend the engaging arm toward the front side and thereby breaking the engagement of the molding with the engaging arm. In this case, the removal of the molding by the procedure described above can be accomplished without inflicting any damage on the clip, whereby the clips can be used again. Reuseability of clips proves highly advantageous for the purpose of replacement of the molding or for adjustment as required during the attachment of molding.

What is claimed is:

1. A one-piece plastic molding clip including a generally planar base plate adapted to be attached on its back side by adhesive means to the window opening flange in an automobile, at least one engaging arm attached at one end to a first edge of said base plate and extending substantially parallel to and in spaced relation to the plane of the central portion of said base plate, and at least one arm being provided at the free end thereof with a molding-engaging snap catch, and at least one resilient receiving member disposed in spaced relation to the front side of said base plate and connecting means permitting it to extend from adjacent the upper edge of the base plate opposite said first edge downwardly in spaced relation to the front side of said base plate in the direction of said first edge and provided at the opposite leading end thereof with a receiving portion adapted to resiliently receive the edge of a plate of glass.

2. The molding clip according to claim 1, wherein said engaging arm is provided adjacent the free end thereof with a protruding piece adapted to be engaged by a tool for releasing the engagement.

3. The molding clip according to claim 1, wherein a base flange extends from said first edge of said base plate perpendicularly to the front side.

4. A molding clip according to claim 3, wherein there are at least two resilient receiving members each connected by said means at one end to said base flange in spaced relation to said base plate and having their opposite ends being positioned adjacent to the upper edge of the base plate opposite said first edge but capable of movement relative to said upper edge in sliding relationship.

5. The molding clip according to claim 3, wherein there are at least two resilient receiving members each connected by said means at one end to the upper edge of the base plate opposite said first edge and connected at the other end to said base flange.

6. The molding clip according to claim 1, wherein the front sides of said resilient receiving members are twisted sideways so that the opposed edges thereof protrude in the shape of straight ridges throughout a substantial portion of the length of the receiving members.

7. The molding clip according to claim 1, wherein tongue pieces are extended from the upper edge of the base plate and angularly pass through a plane lying on the backside of said base plate.

8. A molding clip according to claim 1 wherein there is provided a single engaging arm centrally disposed relative to said base plate and there are a pair of resilient receiving members disposed on opposite sides of said engaging arm.

9. A molding clip according to claim 1, wherein there are a pair of engaging arms disposed adjacent opposite ends of said base plate and a single relatively broad resilient receiving member disposed intermediate said engaging arm.

10. A molding clip of a plastic material which comprises a base plate adapted to be attached on its backside by adhesive means to the window opening flange in an automobile, an engaging arm vertically rising from one edge of and in substantially parallel spaced relation to the front side of said base plate, said arm provided at the free end thereof with a molding-engaging snap catch, resilient receiving pieces disposed in spaced relation to the front side of said base plate and adapted to resiliently receive the edge of a glass plate and a protrusion means formed at the lower portion of the backside of said base plate and extending outwardly from said backside a distance less than the thickness of the said adhesive means for fastening the base plate to said flange.

11. The molding clip according to claim 10, wherein said protrusion means is formed continuously in parallel to the lower said one edge of the base plate.

12. The molding clip according to claim 10, wherein said base plate includes lateral extended portions formed one on each side edge of the base plate and said protrusion means is also provided on said extended portions.

* * * * *

UNITED STATES PATENT OFFICE
CERTIFICATE OF CORRECTION

Patent No. 4,135,277　　　　　　　　Dated January 23, 1979

Inventor(s) Tadayoshi Taniai and Takuo Yuda

It is certified that error appears in the above-identified patent and that said Letters Patent are hereby corrected as shown below:

The assignee on the title page should read:

Nissan Motor Co., Ltd., Yokohama, Japan; and

Nifco Inc., Tokyo, Japan

Signed and Sealed this

Eighth Day of May 1979

[SEAL]

Attest:

RUTH C. MASON
Attesting Officer

DONALD W. BANNER
Commissioner of Patents and Trademarks